United States Patent [19]

Norton

[11] 3,714,249

[45] Jan. 30, 1973

[54] HYDROXYALKYLAMINOALKYLAMIDES AND THEIR PREPARATION

[75] Inventor: Richard V. Norton, Wilmington, Del.

[73] Assignee: Sun Oil Company, Philadelphia, Pa.

[22] Filed: Jan. 22, 1971

[21] Appl. No.: 109,045

[52] U.S. Cl............260/558 R, 260/309, 260/558 A, 260/559 A, 260/561 R, 260/561 A, 260/857 R, 260/858, 252/357, 252/358, 252/524
[51] Int. Cl......................C07c 103/38, C07c 103/30
[58] Field of Search......:...................260/558, 559, 561

[56] References Cited

UNITED STATES PATENTS

| | | | |
|---|---|---|---|
| 2,648,708 | 8/1953 | Steiger | 260/558 |
| 3,192,214 | 6/1965 | Krapcho | 260/559 |
| 3,083,143 | 3/1963 | Schmid et al. | 260/561 |
| 2,551,647 | 5/1951 | Steiger | 260/396 |
| 2,233,296 | 2/1941 | Nelles et al. | 260/561 |

*Primary Examiner*—Harry I. Moatz
*Attorney*—George L. Church, Donald R. Johnson, Wilmer E. McCorquodale, Jr. and Paul Lipsitz

[57] ABSTRACT

Hydroxyalkylaminoalkylamides and the process of making them by reacting alkyl and aryl nitriles with alkanolamines at about 100° to about 220°C. under anhydrous, non-catalytic conditions and at a mole ratio of alkanolamine per nitrile group exceeding 2 to 1.

9 Claims, No Drawings

HYDROXYALKYLAMINOALKYLAMIDES AND THEIR PREPARATION

The reactions of nitriles with alkanolamines are known in the art to produce oxazolines. For example, U. S. Pat. No. 2,402,198 (Donald J. Loder, assigned to du Pont, issued June 18, 1946) discloses a catalytic reaction of nitriles with ethanolamine whereby one mole of ethanolamine reacts with one mole of nitrile to yield the cyclic oxazoline. Further, in U. S. Pat No. 2,820,801 (Peter L. De Benneville and Charles L. Levesque to Rohm & Haas Company, Issued Jan. 21, 1958) there is disclosed an aqueous, catalytic reaction whereby one mole of nitrile and one of alkanolamine react with no ammonia evolution to give an N-$\beta$-hydroxyethylamide.

Surprisingly, it has now been found, however, that under certain reaction conditions two moles of alkanolamine will react with a nitrile to form novel linear hydroxyalkylaminoalkylamides having the structure

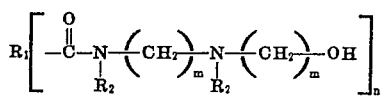

where $R_1$ is an alkyl, alkylene, aryl, aralkyl, or a lower alkyl substituted aryl group, $R_2$ is H or lower alkyl, $m$ is an integer of from 2 to 4 and $n$ is a small integer of from about 1 to about 6, preferably 1 to 3. In accord with the process of the invention these compounds are made by reacting under anhydrous conditions in the absence of a catalyst, a nitrile of structure $R_1-CN)_n$ with an alkanolamine of structure

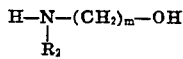

, where $R_1$, $R_2$, $m$ and $n$ are above defined, said reaction being conducted at a temperature of from about 100° to about 220°C., at essentially atmospheric pressure and at a mole ratio of alkanolamine per nitrile group exceeding 2 to 1.

Examples of useful nitriles include alkyl nitriles such as acetonitrile, propionitrile, n-butyronitrile, isobutyronitrile, and the like; alkylene dinitriles such as malonitrile, succinonitrile, gluaronitrile, adiponitrile and the like, aromatic nitriles such as benzonitrile, toluonitrile, terephthalonitrile, isophthalonitrile, 1-cyanonaphthalene, 1,5-dicyanonaphthalene and the like. Aralkyl nitriles such as phenylacetonitrile, 1-naphthaleneacetonitrile, gamma-phenylbutyronitrile, and the like are also useful. Preferably, when $R_1$ is an alkyl or alkylene group it will contain from two to ten carbon atoms. When $R_1$ is an aryl, aralkyl, or lower alkyl substituted aryl group it will contain, preferably, from seven carbon atoms (e.g., benzonitrile) to twelve carbon atoms (e.g., 1,5-dicyanonaphthalene). Preferred nitriles are the mono and dinitriles of the benzene series.

Useful alkanolamines include hydroxyethylamine (ethanolamine), hydroxyisopropylamine, hydroxybutylamine, 3-hydroxypropylamine, N-methylethanolamine, N-t-butylethanol-amine, and the like. The $R_2$ substituent on the alkanolamine will usually be an alkyl group having no more than about six carbon atoms.

In carrying out the reaction of the invention, the nitrile and alkanolamine are simply mixed and heated to reaction temperature; i.e., from about 100° to about 220°C., and when reaction temperature for the particular combination of reactants is reached, ammonia is evolved. The reaction is conducted at atmospheric pressure, under anhydrous conditions and in the absence of any catalyst. While it is possible to carry out the reaction in certain solvent systems, solvents are not necessary. However, certain polar solvents such as dioxane, pyridine, the dimethylether of ethylene glycol and the like are very useful in that they permit reaction to occur at reflux and also permit easy solvent removal from the product by distillation. Other solvents such as dimethylsulfoxide, dimethylformamide, dimethylacetamide, and the like are also operable, but may be troublesome in hampering product recovery. Nonpolar solvents such as aromatic hydrocarbons and high boiling aliphatic compounds are not useful as a reaction medium.

It has been observed that if anhydrous conditions are not maintained, the reaction product contains only one alkanolamine moiety per cyano group instead of two. As indicated, the process requires that the mole ratio of alkanolamine to nitrile function exceed 2 to 1 and preferably will be between about 5:1 to 10:1. For practical purposes this ratio will not normally exceed about 20:1.

Completion of reaction is readily determined by cessation of ammonia evolution (one mole of ammonia is evolved for each cyano group). The reaction mass is worked up by any conventional procedure to recover the product. This is conveniently done by first vacuum distilling off excess alkanolamine and recovering the residue product by standard crystallization procedures. Conventional separation procedures are also useful where the linear hydroxyalkylaminoalkylamide product is mixed with any by-products of the reaction.

The hydroxyalkylaminoalkylamide products are white or wax-like solids having sharp melting points. They are generally insoluble in the usual organic solvents at room temperature, but have sufficient solubility at elevated temperatures to make them responsive to purification procedures by crystallization. Water solubility of the compounds is essentially complete at all proportions and such aqueous solutions show strong surfactant properties.

Examples of typical compounds of the invention include the mono- and bis-amide compounds such as 2-hydroxy-ethylaminoethylbenzamide of structure.

$C_6H_5CONHCH_2CH_2NHCH_2CH_2OH$, 2-hydroxyethylaminoethyltoluamide, 2-hydroxypropylaminopropylbenzamide, bis [2-hydroxyethylaminoethyl] terephthalamide of structure , 2-hydroxyethylaminoethylacetamide, 2-hydroxyhexylaminohexylbutyramide, and the like.

These compounds have various significant uses. For example, the bis-compounds are valuable chain extenders in the polymerization of urethanes, and the mono-amides, as well as the bis-amides, are surface active agents which may be used, for example, to prepare emulsions and dispersions. The compounds may also be subjected to ring closure with a dehydrating agent by the methods known in the art to form heterocyclic compounds which have known utility as emulsifiers, sequestering agents, and textile finishing agents (e.g., softeners and the like).

For example the compound

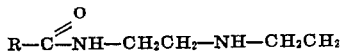

where R is a long chain alkyl or alkaryl group is readily ring closed to yield

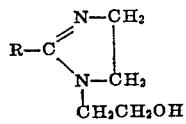

which is a good emulsifier and detergent.

In order to more fully illustrate the invention, the following examples are given.

Example 1

A mixture of 100g (0.78 moles) of terephthalonitrile and 616g (10.1 molar) of ethanolamine was heated with stirring to 145°C. Ammonia began to evolve from the reaction mixture and the reaction was increased in temperature to about 170°C. as the ammonia was swept from the system with nitrogen. The reaction mass was vacuum distilled at 77°–100°C. at 2mm Hg. to remove ethanolamine and the residue dissolved in 2 liters of hot ethanol. On cooling, white rhombic crystals separated and were filtered off to yield 98.8g of crude product which was taken up in a mixture of 1 liter of ethanol and 0.5 liter of ethylacetate, boiled and then cooled to yield a new crop of crystalline product. This product was again purified by recrystallization from 1.3 l. of ethanol and in this way 40.3g of product obtained. Work-up of filtrates from the recrystallization yielded another 41.9g of product to give a total of 82.2 g (31.2 percent) of bis-[2-hydroxyethylaminoethyl] terephthalamide. Infrared and elemental analysis confirmed the identity of the product as

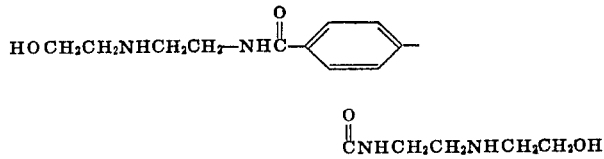

which melts at 161°–161.6°C. This material has utility as a chain extender in the polymerization of polyurethanes.

Example 2 P-Toluonitrile with Ethanolamine

A mixture of 69g (0.59 moles) of p-toluonitrile and 153g (2.5 mole) of ethanolamine was refluxed at 155°–160°C. Ammonia was evolved and swept from the system with nitrogen. After 22 hours a clear, viscous, amber fluid resulted. This material was then vacuum distilled to remove ethanolamine. On cooling and standing for about one month the liquid had solidified to a white wax. Analysis by NMR confirmed that the product

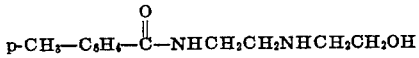

was obtained.

Example 3A

A mixture of 40.2g (0.39 moles) of benzonitrile and 154g (2.52 moles) of ethanolamine was stirred at the temperature maintained at 150°–170°C. over a period of about 6.5 hours. The reaction mass was then distilled at 45°–50°C. at 0.3 mm Hg to remove ethanolamine and further distilled at 190°–195°C. at 0.3 mm. The viscous pot residue of 25.7g was the product amide of structure $C_6H_5CONHCH_2CH_2NHCH_2—CH_2OH$ which structure was confirmed by NMR analysis.

Example 3B

When 0.390 moles of benzonitrile and 2.52 moles of ethanolamine was reacted at 125° to 163°C. as in A above except that 0.555 moles of water were introduced into the system, the reaction product was an amber glass which was determined by NMR analysis to be the mono-adduct of structure $C_6H_5CONHCH_2—CH_2OH$.

Example 4 Benzonitrile with N-Methylaminoethanol

A mixture of 20.6g (0.2 moles) of benzonitrile and 45g (0.6 mole) of N-methylaminoethanol was held at 155°C. for 19 hours. The product obtained after ammonia was completely evolved and swept for the reactor was distilled at 200°–240°C. at 0.5 mm Hg and yielded 36g of crude product. A fraction boiling at 165°–175°C. at 0.01 mm Hg was identified by mass spectroscopy and elemental analysis to be the product of structure

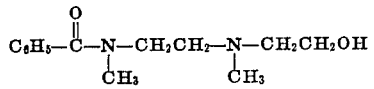

Example 5

A mixture of 21.1g (0.195 moles) of adiponitrile and 154g (2.52 moles) of ethanolamine was held at 156°–170°C. for 7 hours. The reaction mass was then vacuum distilled at 55°–70°C. at 0.3 mm Hg to recover 52g of unreacted materials. The pot residue product solidified to an amorphous wax whose NMR analysis confirmed the product as $[HOCH_2CH_2NHCH_2CH_2—NHCOCH_2CH_2d]_2$.

The invention claimed is:

1. The compound of the formula

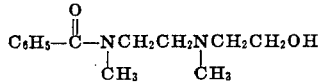

2. The compound of the formula $[HOCH_2CH_2NHCH_2CH_2hcoch_2CH_2]_2$.

3. A process for preparing a hydroxyalkylaminoalkylamide by reacting under anhydrous conditions in the absence of a catalyst, (a) a nitrile of structure $R_1(CN)_n$ where $R_1$ is selected from the group of alkyl of 1 to 10 carbon atoms, alkylene of two to 10 carbon atoms, phenyl, naphthyl, phenylene, lower alkyl substituted phenyl of from seven to 12 carbon atoms, phenylalkyl of seven to 12 carbon atoms, and lower alkyl substituted phenylene of from seven to 12 carbon atoms, and *n* is a small integer of from one to three, with (b) an alkanol-amine of structure

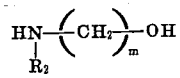

where $R_2$ is H or lower alkyl and *m* is an integer of 2 to 4, said reaction being conducted at a temperature of from about 100° to about 220°C, an essentially atmospheric pressure, and at a mole ratio of alkanolamine per nitrile group exceeding 2 to 1, but less than about 20:1.

4. The process of claim 3 where the nitrile is an aromatic dinitrile.

5. The process of claim 3 where the nitrile is a phthalonitrile.

6. The process of claim 3 where the nitrile is toluonitrile.

7. The process of claim 3 where the nitrile is benzonitrile.

8. The process of claim 3 where the nitrile is an alkylenedinitrile.

9. The process of claim 3 where the nitrile is adiponitrile.

* * * * *